Sept. 28, 1954
R. J. ALTGELT
2,690,111
OVERLOAD DEVICE FOR IMPLEMENTS
Filed Oct. 3, 1950
2 Sheets-Sheet 2
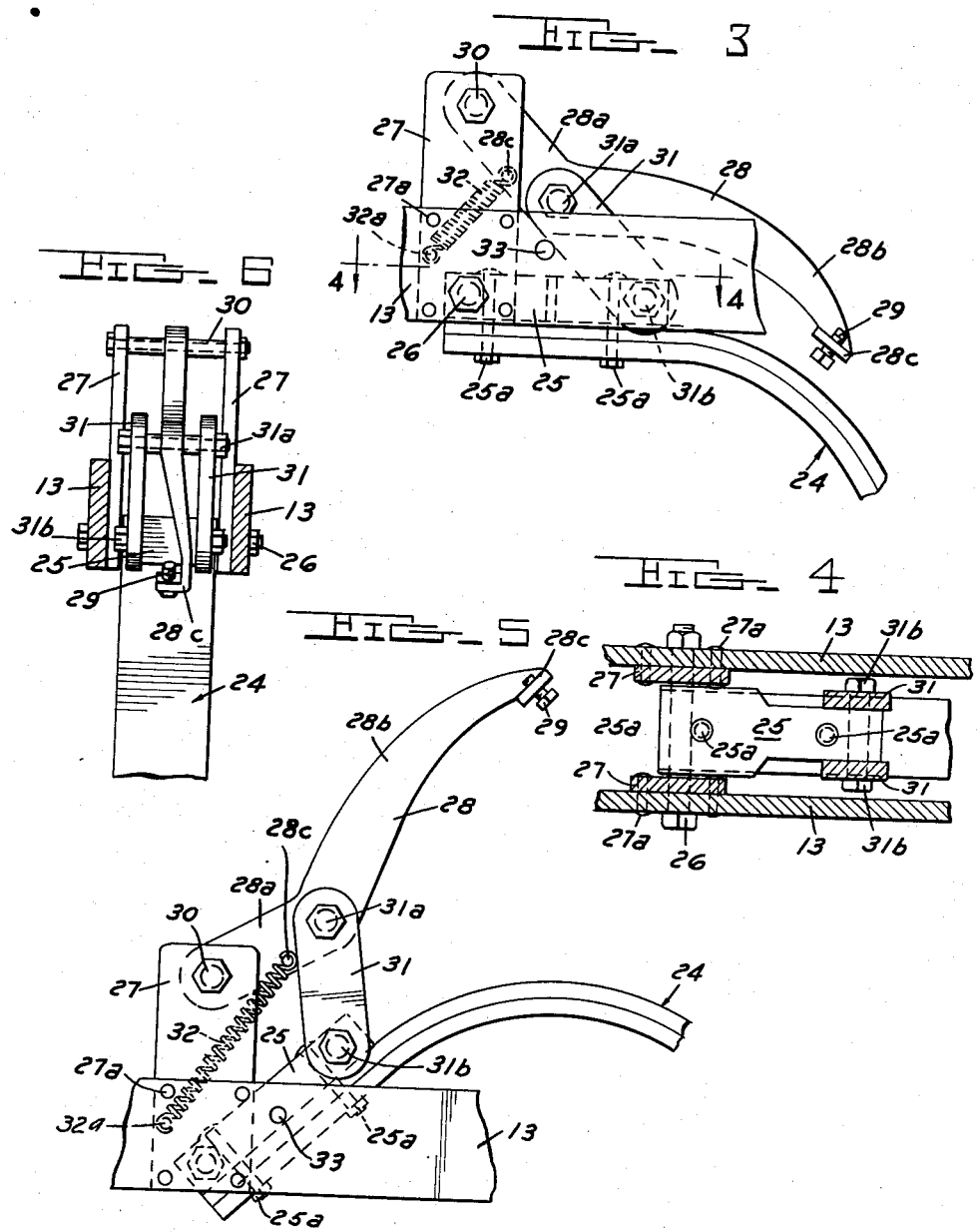
INVENTOR.
RUDOLPH J. ALTGELT
BY
ATTORNEY Patented Sept. 28, 1954

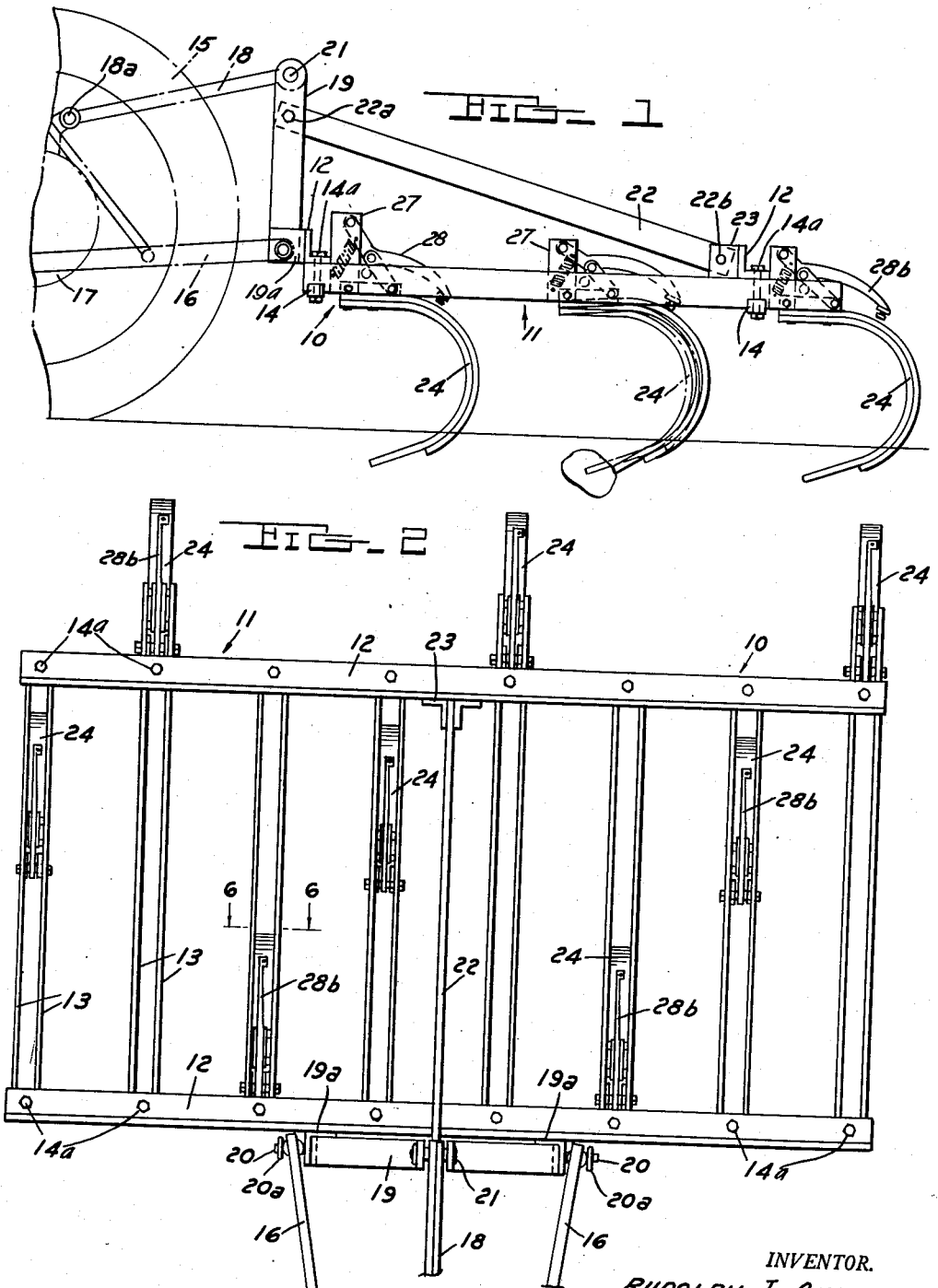

2,690,111

UNITED STATES PATENT OFFICE 2,690,111

OVERLOAD DEVICE FOR IMPLEMENTS

Rudolph J. Altgelt, South Bend, Ind., assignor, by mesne assignments, to Ford Motor Company, Dearborn, Mich., a corporation of Delaware Application October 3, 1950, Serial No. 188,235

8 Claims. (Cl. 97—47.88)

This invention relates to an overload device for implements and more particularly for farm implements of the cultivator type.

Most tillable land has some hidden obstructions in the soil in the form of large and usually immovable objects such as rocks, roots, or stumps. These objects repeatedly cause severe damage to earth working implements utilized first in preparing the soil for seeding and subsequently in cultivating. It is obviously impractical to remove all of these obstacles hence some provision must be made to avoid damage to the earth working elements of the implement when such elements strike the hidden obstruction.

Accordingly, it is an object of this invention to provide an improved overload release device for an earth working implement to substantially eliminate the possibility of breakage of the earth working elements of the implement.

Another object of this invention is to provide an overload device for an implement which will positively lock the earth working element in working position for normal working conditions and yet which will promptly release the earth working element upon striking an obstruction to prevent damage thereto.

A particular object of this invention is to provide an overload device which utilizes the resilient deflection of the earth working element for actuation of such device when such element encounters an obstruction in the ground, and hence assures release of the earth working element to clear the obstruction prior to development of excessive stresses in the earth working implement.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a side elevational view of an implement incorporating an overload device of this invention, shown attached to a tractor.

Fig. 2 is a plan view of the implement shown in Fig. 1.

Fig. 3 is an enlarged detail side view of the overload device of this invention.

Fig. 4 is a sectional view taken along the plane 4—4 of Fig. 3.

Fig. 5 is a view similar to Fig. 3 showing the overload device in its released position.

Fig. 6 is a sectional view taken along the plane 6—6 of Fig. 2.

As shown on the drawings:

Briefly this invention comprises a toggle linkage normally disposed in a "dead center" relationship for positively holding an earth working implement in ground working position, plus a toggle tripping lever operatively connected to the toggle linkage and operable by resilient deflection of the earth working element to effect release of the toggle linkage to permit the earth working element to shift to clear an obstruction in the ground. The earth working element of the implement is conveniently pivotally mounted to the implement frame and is held rigidly in working position when the toggle linkage is aligned with, or past its "dead center" position. The tripping lever is engaged by the earth working element only when such element is deflected to a predetermined extent by striking an obstruction. Further deflection then shifts the tripping lever, whereupon the toggle linkage is moved "over center" thereby unlocking the earth working element and permitting such to freely pivot upwardly out of the way of the obstruction in the ground. A spring is provided to return the tripping lever, toggle linkage and earth working element to their normal locked position, a stop being also provided to prevent the toggle linkage from going substantially beyond the "dead center" relationship. An adjusting device is provided on the end of the tripping lever to adjust the sensitivity of response of the tripping lever to deflection of the earth working element.

In Figs. 1 and 2 there is shown an implement 10 of the type which may be used for general cultivating, or for plowing in arid areas. The implement 10 comprises a rectangular frame 11 formed by a pair of longitudinally spaced angle iron bars 12 to which are secured a plurality of transversely spaced pairs of parallel bars 13 as best shown in Fig. 2. Each pair of bars 13 are respectively secured at their ends to the underside of angle bars 12 by a combined clamp and spacer member 14 and bolts 14a to maintain bars 13 in parallel relationship. Every third pair of parallel bars 13 projects somewhat beyond the trailing angle bar 12 to facilitate the spacing of earth working elements on the frame 11 as will be described.

Frame 11 is preferably mounted on a tractor 15 having the well known power-lifted, three point hitch linkage. Such linkage comprises transversely spaced, power-lifted hitch links 16 pivoted at one end to the tractor axle housing 17 and a top link 18 is pivotally secured as at 18a to the top of tractor axle housing 17. A so-called A-frame 19 is secured in a vertical position to the leading angle bar 12 of frame 11 by welding the lower ends of such frame to a pair of spaced angle lugs 19a as shown in Figs. 1 and 2. Oppositely disposed horizontal pins 20 are respectively provided at the lower end portions of A-frame 19 and the trailing ends of hitch links 16 are respectively mounted on such pins. A linch pin 20a secures hitch links 16 against displacement. Top link 18 is pivotally secured between the upstanding end portions of A-frame 19 by a transversely disposed pin 21. A-frame 19 is braced by a diagonal brace 22, such brace being connected at its forward end to A-frame 19 by a bolt 22a. The rear end of brace member 22 is secured between a pair of angle shaped lugs 23 secured to the trailing angle bar 12 by a bolt 22b. Thus implement 10 may be readily lifted to a transport position by operation of the power-lifted hitch links 16.

Implement 10 is provided with a plurality of depending earth working tool elements or tines 24. Tines 24 are of substantially semi-circular configuration and are of well known construction. The shanks of such tines are preferably heat treated to provide a spring temper to obtain a limited resiliency, so as to effectively resist the ground drag and to deflect somewhat for small obstructions without breaking. A plurality of tines 24 are mounted on frame 11, each pair of parallel bars 13 supporting a tine 24. All of the tines are arranged in staggered relationship as best shown in Fig. 2. The shank portion of each spring tine 24 is secured by a pair of vertically disposed bolts 25a to a rectangular mounting block 25. The forward end of block 25 is pivotally mounted between a pair of parallel bars 13 by a transverse bolt 26. Adjacent each block 25, a pair of upstanding transversely spaced brackets 27 are respectively secured in opposed relationship to each pair of parallel bars 13 by a plurality of rivets 27a. Brackets 27 and bars 13 are apertured to receive bolt 26.

Between each mounting block 25 and the adjacent brackets 27, a toggle linkage is mounted. Such linkage may comprise a member 28 pivotally mounted between each pair of brackets and having a straight link portion 28a and an arcuately shaped trip lever portion 28b. Trip lever portion 28b terminates in a transversely disposed lug portion 28c and a bolt 29 is threadably secured to such lug portion at 90° thereto for a purpose to be later described. The end of link portion 28a is pivotally mounted between the upstanding brackets 27 by a bolt 30 transversely supported within suitable apertures in such brackets.

The link portion 28a of member 28 is connected to block 25, hence to the spring tine 24, by a pair of links 31. One end of links 31 is pivotally secured by a bolt 31a to the member 28 at the juncture of shank portion 28a and the arcuate trip portion 28b. The other end of links 31 is pivotally connected by a bolt 31b to the block member 25. Hence link portion 28a and links 31 define a toggle linkage.

In Fig. 3 the link portion 28a and links 31 are shown in aligned relationship, which position is what may be called a "dead center" position. In this position the link 31 and link portion 28a rigidly lock spring tine 24 in a ground working position. Link 31 and link portion 28a are yieldingly secured in such position by a helical spring 32. Spring 32 has one end looped about a transverse stud 28c provided on link portion 28a and the other end of spring 32 is looped about a stud 32a suitably secured on the inside face of one of the brackets 27. A stop pin or bolt 33 is secured in transverse relationship between each pair of bars 13 so that the under side of link 31 rests against such stop when the toggle linkage is in, or slightly beyond its "dead center" position as shown in Fig. 3.

As was previously mentioned, there are a plurality of spring tines 24 pivotally secured to frame 11 between the spaced parallel bars 13 in staggered relationship as shown in Fig. 2. This arrangement permits a complete coverage of the ground traversed whereby the soil is evenly and completely worked. As each of the spring tines 24 is provided with the identical overload device, the description of but one of such devices only is believed necessary.

When cultivating or plowing with implement 10 the lower ends of tines 24 engage the earth. A suitable shovel, sweep or other point (not shown) may be secured to the ends of tines 24 as desired, depending upon the type of work the implement is to be utilized for. In the normal operation of implement 10 the deflection of the spring tines is generally not sufficient to permit the tine to deflect rearwardly to contact screw 29 provided in the lower end of lever 28b. When, however, any of the tines 24 strike a relatively immovable obstruction in the ground such as a large rock or stump, the tine will be forcibly deflected rearwardly into contact with the head of bolt 29. Such contact will then rotate trip lever portion 28b of member 28 in a counterclockwise direction, as viewed in Fig. 3, whereupon link 31 will be rotated in a clockwise direction and the toggle linkage shifted out of its "dead center" position. Unlocking of the toggle linkage from its "dead center" position will then permit the spring shank 24 to rotate about its pivot axis defined by bolt 26 to clear the obstruction in the ground. When the spring tine 24 has passed over the obstruction, the bias of spring 32 returns member 28 and link 31 to "dead center" position, carrying with them spring tine 24 from the position shown in Fig. 5 downwardly to the working position shown in Fig. 3, links 31 again coming to rest against stop 33.

Bolt 29 permits convenient adjustment of the degree of deflection required of tine 24 before the toggle linkage is released.

From the foregoing description it is therefore clearly apparent that there is here provided an unusually simple, yet effective overload release device for use with an implement having ground working elements which are subject to engagement with relatively immovable obstructions in the ground. Such overload device substantially eliminates all possibility of damage to the earth working elements by permitting the earth working elements to freely pivot out of the way of the obstruction when the rearward force is sufficient to stress the earth working element to a predetermined extent. The inherent spring tension of the earth working element is utilized to actuate the tripping lever. Of equal importance is the fact that the described overload device positively locks the spring tines in earth working position for normal use.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In an implement having a pivoted resilient earth working element, a trip lever pivotally mounted on the implement, said trip lever having an end portion constructed and arranged to lie adjacent the earth working element in its working position, a link member pivotally connected between a medial portion of said trip lever and said earth working element, and means for normally maintaining the pivot axes of said link and said trip lever in substantially a straight line whereby the earth working element is locked relative to the implement, said earth working element being resiliently deformable when overloaded to shift said trip lever to misalign said pivot axes, thereby permitting the earth working element to pivot to a non-working position.

2. In an implement having a frame, a resilient tine member pivotally mounted on the frame, a toggle linkage including a trip lever, means for pivotally connecting said toggle linkage between said tine member and the frame, said toggle linkage being normally positioned in a substantially "dead center" relationship for locking said tine member in a ground working position, and means on said trip lever engageable by said tine member when such tine member is resiliently deflected to shift said trip lever and shift said toggle linkage out of said "dead center" relationship, thereby permitting said tine member to rotate to a non-working position.

3. The combination defined in claim 2 plus resilient means for returning said tine member to a ground working position and said linkage to the "dead center" position.

4. The combination defined in claim 2 wherein said last mentioned means comprises a bolt member, said bolt member being axially adjustable relative to said tine member.

5. In an implement having a pivoted earth working tool, a toggle linkage including a trip member, means for respectively pivotally connecting the ends of said toggle linkage to the implement and said earth working tool, means normally positioning said toggle linkage substantially at its "dead center" position for positively locking said earth working tool in a working position, said trip member extending adjacent said tool and shiftable by resilient deflection of said earth working tool when said earth working tool is overloaded thereby shifting said toggle linkage out of "dead center" relationship to release said tool for pivotal movement.

6. In an implement having a frame, a resilient tine member pivotally mounted on the frame, a pair of links pivotally interconnected to form a toggle linkage, means for pivotally connecting said toggle linkage between said tine member and the frame so that said tine member is locked in ground working position when said toggle linkage is disposed in substantially "dead center" relationship, a trip lever secured to one of said links and extending to a position behind a portion of said tine member, means on said trip lever engageable by said tine member when said tine member is resiliently deflected to a predetermined extent to shift said trip lever to break said toggle linkage from its "dead center" relationship.

7. In an implement having a frame, a resilient tine member pivotally mounted on the frame, a pair of links pivotally interconnected to form a toggle linkage, means for pivotally connecting said toggle linkage between said tine member and the frame so that said tine member is locked in ground working position when said toggle linkage is disposed in substantially "dead center" relationship, a trip lever secured to one of said links and extending to a position behind a portion of said tine member, and a stop adjustably mounted on said trip lever and engageable by said tine member when said tine member is resiliently deflected to a predetermined extent to shift said trip lever and break said toggle linkage out of its said "dead center" relationship.

8. The combination defined in claim 7 plus resilient means for urging said toggle linkage to said "dead center" position, and a stop engageable by one of said links at said "dead center" position.

References Cited in the file of this patent

UNITED STATES PATENTS

| Number | Name | Date |
| --- | --- | --- |
| 1,013,710 | Widder | Jan. 2, 1912 |
| 1,068,832 | Alsup | July 29, 1913 |
| 1,326,065 | Klause | Dec. 23, 1919 |
| 2,395,342 | Morkoski | Feb. 19, 1946 |
| 2,573,221 | Romig | Oct. 30, 1951 |

FOREIGN PATENTS

| Number | Country | Date |
| --- | --- | --- |
| 8716/27 | Australia | Sept. 8, 1928 |